United States Patent [19]

Columbus

[11] 4,012,325

[45] Mar. 15, 1977

[54] BIOLOGICAL FLUID DISPENSER AND SEPARATOR

[75] Inventor: Richard L. Columbus, Rochester, N.Y.

[73] Assignee: Eastman Kodak Company, Rochester, N.Y.

[22] Filed: May 27, 1975

[21] Appl. No.: 581,345

Related U.S. Application Data

[63] Continuation-in-part of Ser. No. 539,557, Jan. 8, 1975, abandoned.

[52] U.S. Cl. .............................. 210/516; 128/2 F; 210/DIG. 23; 233/26

[51] Int. Cl.[2] .............................. B01D 21/26

[58] Field of Search .............................. 23/203 B, 259; 73/61.1 C, 425.4 P, 425.4 R, 425.2; 128/2 F, 218 M, 220, 272; 141/275; 210/83, 84, 514–518, DIG. 23, DIG. 24; 222/1, 23, 52, 401, 420; 233/1 A, 1 R, 26

[56] References Cited

UNITED STATES PATENTS

| | | | |
|---|---|---|---|
| 2,653,609 | 9/1953 | Smith | 128/272 |
| 3,701,433 | 10/1972 | Krakauer et al. | 210/DIG. 23 |
| 3,706,306 | 12/1972 | Berger et al. | 128/2 F |
| 3,750,645 | 8/1973 | Bennett et al. | 128/272 X |
| 3,771,965 | 11/1973 | Grams | 128/2 F X |
| 3,779,383 | 12/1973 | Ayres | 210/DIG. 23 |
| 3,783,935 | 12/1973 | Lukacs et al. | 210/83 X |
| 3,852,194 | 12/1974 | Zine, Jr. | 210/83 |
| 3,897,902 | 8/1975 | Yanez, Jr. | 128/2 F |
| 3,909,419 | 9/1975 | Ayres | 210/DIG. 23 |
| 3,920,549 | 11/1975 | Gigiello et al. | 210/DIG. 23 |
| 3,920,557 | 11/1975 | Ayres | 210/DIG. 23 |
| 3,929,646 | 12/1975 | Adler | 210/DIG. 23 |

*Primary Examiner*—Charles N. Hart
*Assistant Examiner*—Robert H. Spitzer
*Attorney, Agent, or Firm*—D. M. Schmidt

[57] ABSTRACT

A blood serum separator-dispenser capable of collecting, separating and/or dispensing is disclosed a biological fluid such as serum from an essentially closed container. A valve can be provided to separate the container into two compartments, one for serum separation and the other for serum dispensing.

29 Claims, 26 Drawing Figures

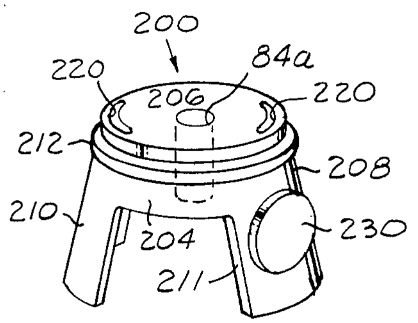
FIG. 14
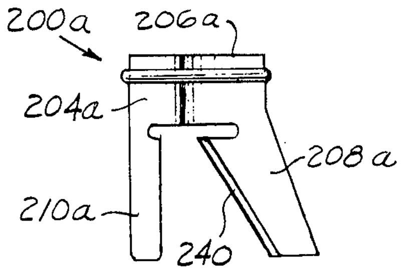
FIG. 15
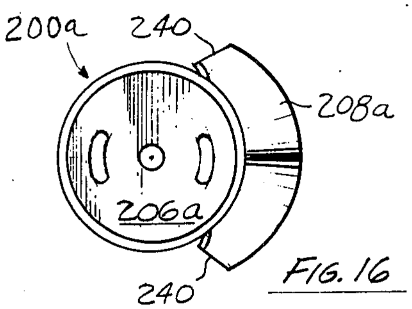
FIG. 16
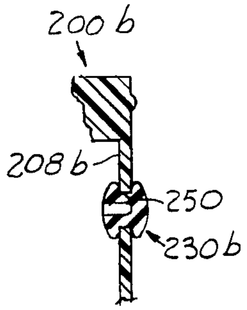
FIG. 17
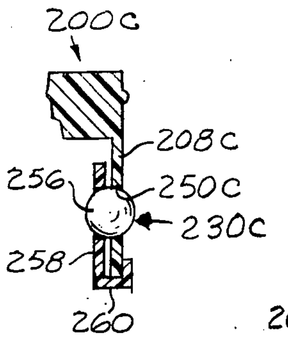
FIG. 18
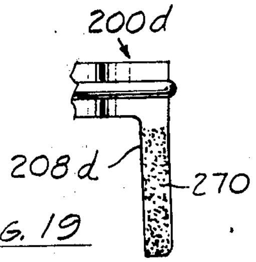
FIG. 19
FIG. 20
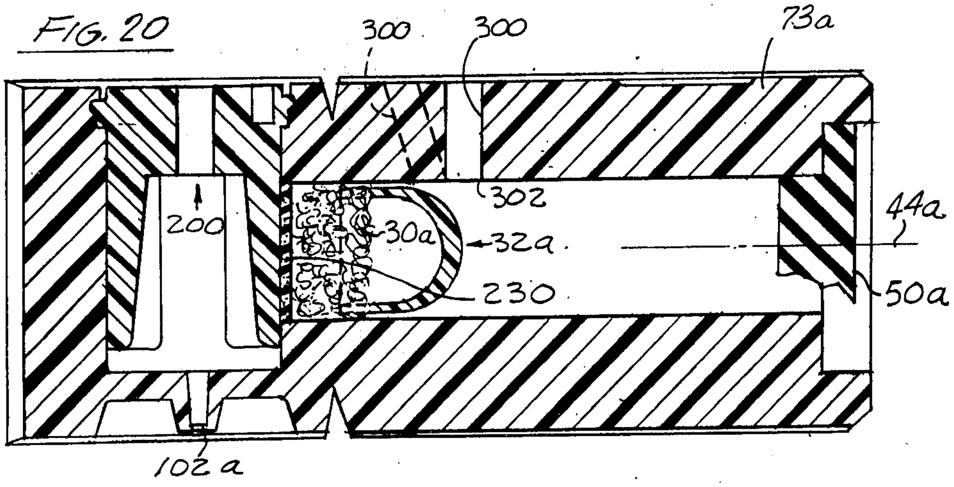

BIOLOGICAL FLUID DISPENSER AND SEPARATOR

RELATED APPLICATIONS

This application is a continuation-in-part application of U.S. Ser. No. 539,557 filed on Jan. 8, 1975, now abandoned.

BACKGROUND OF THE INVENTION

1. Field of the Invention

This invention relates to a container which provides for the collection of a sample of a biological fluid, the centrifugation of the fluid in the case of blood, and accurate dispensing of micro amount of the fluid for testing, all without requiring the pouring of the fluid into a variety of separate containers.

2. State of the Prior Art

The most common conventional method of providing biological fluid such as blood serum for clinical analysis utilizes a plurality of containers en route to the actual test. That is, the blood sample is conventionally collected in an evacuated container, and separation of the serum from the whole cells may be achieved by centrifuging the sample within that container, or within another container to which the sample has been transferred. Thereafter, the serum is commonly poured off into yet another container for the desired clinical testing. All such transfer operations are time consuming, requiring either hand processing or complicated, expensive automatic handling. Furthermore, whenever there is a transfer of a liquid sample to a separate, open container, the sample is aerated and $CO_2$ loss or gain can occur. There is also the danger of improper transfer, either by the use of the wrong container, by the improper patient labeling of the new container, or by both. Still further, contamination of the serum by foreign materials or infection of the operator can occur. Reuse of the same dispensing device for sequential samples requires careful sterilization to avoid contamination. Thus, a system which keeps the blood sample confined to essentially one container from its collection to the actual dispensing for analysis is a distinct, sought-after improvement.

At the centrifuging stage, a variety of means have been provided for more or less plugging the serum-cell interface that is formed during centrifuging, whereby remixing of the cells and serum is prevented. U.S. Pat. Nos. 3,647,070; 3,779,383; 3,780,935; 3,800,947; 3,849,072 and 3,850,174 are representative of devices of this nature. In U.S. Pat. Nos. 3,647,070; 3,779,383; 3,800,947 and 3,849,072, for example, there are disclosed mechanical valve devices which prevent flow across the interface. Such devices however are quite complicated, resulting in increased cost of manufacture, and requiring in some instances more than one tubular container. Furthermore, they are susceptible to mechanical failure and do not automatically seek out the serum-cell interface. Instead, a mechanical constriction of some kind must be provided which will not permit variation in blood volumes. Devices such as are shown in U.S. Pat. No. 3,779,383 are not provided with valve means at the serum end to permit ready removal of the serum. Instead, the plug must be removed and the serum either poured off, as by tilting the container, or it must be aspirated or otherwise drawn off.

Of the many devices available to provide blood serum for analysis, the one which has become the norm is the evacuated container. This is simply a partially evacuated glass tube open at one end except for a septum placed there. One improvement over such an evacuated container which is particularly useful comprises a glass tube open only at one end, a septum fixed to that end when the tube is evacuated, and a movable plug contained within the tube. The plug is preferably a silical gel, with or without a plastic cup-like mandrel positioned with its open end pointed to the septum. By reason of the vacuum, collected blood is easily drawn into the container. The container is then spun about a centrifuge axis adjacent to the septum end, and the gel by reason of its selected specific gravity works up to the serum-cell interface where it plugs the container against remixing of the serum and cells. An example of such a container but without the mandrel is shown in U.S. Pat. No. 3,852,194.

Although such a device is useful in separating the serum from the cells, it has not avoided the transfer difficulties noted above. Furthermore, by pouring out the serum through the theretofore septum-plugged end, it is possible to contaminate the serum with blood cells which collected at the septum-container interface prior to centrifuging, a condition known as "blood-ring contamination." Still further, coagulation is required to assure maximum serum separation, and this requires about a 10 minute "hold" even when coagulants are used.

Other patents relating to blood serum separation in general are U.S. Pat. Nos. 3,645,253; 3,687,296; 3,706,305; 3,706,606; and 3,771,965. Some of these, while not relying on a plug to provide a barrier between serum and cells, use a filter. The disclosure of U.S. Pat. No. 3,771,965 specifically protects the outlet of the evacuated container from blood ring contamination.

In commonly owned U.S. application Ser. No. 539,558, of David Smith entitled "Biological Fluid Dispenser," filed Jan. 8, 1975, there is disclosed the dispensing of a fluid such as serum from a blood separator by the connection thereto of a separate dispensing head, the dispensing head relying, for example, upon piston action to dispense the serum. A conventional blood separator such as the glass tube type described above, is shown.

OBJECTS OF THE INVENTION

It is an object of the invention to provide apparatus for separating blood serum from blood which is capable of transmitting the separated serum to a metering device with a minimum of handling.

A related object of the invention is to provide such apparatus which eliminates the need for the addition of other devices during the processing of the serum, to complete that processing.

Another related object of the invention is to provide such apparatus wherein a single container is used to handle the blood for all its processing prior to actual testing, namely for the collection of a blood sample from a patient, the centrifuging of the sample to segregate the blood serum, and the dispensing of the serum in accurate micro amounts.

Another object of the invention is to provide such apparatus in as compact a form as possible so as to be readily stored and dispensed.

Another object of the invention is to provide a serum separator which minimizes the delay prior to centrifuging which is necessary for coagulation.

Yet another object of the invention is to provide an apparatus for separating blood serum from blood cells by centrifugation, having an improved seal which prevents remixing of the two components.

Still another object is to provide such apparatus which by reason of its simplicity can be disposed of after use thereof with one blood sample, to avoid the need for careful sterilization.

Yet another object of the invention is to provide such apparatus which will prevent blood ring contamination of the serum.

Other objects and advantages will become apparent upon reference to the following Summary and Description of Preferred Embodiments, when considered in light of the attached drawings.

SUMMARY OF THE INVENTION

The invention concerns a blood handling device which simplifies the processing of whole blood taken from a patient whereby serum is extracted therefrom and dispensed for testing. More specifically, there is provided a blood serum separation device comprising opposed walls arranged about an axis to define a blood separation compartment having a blood inlet portion, a serum-collecting portion, and a cell-collecting portion, the serum-collecting end being adjacent one end of the compartment, means removably secured to the serum-collecting end for temporarily blocking flow of serum out of the compartment, and a movable plug positioned transversely across the compartment and in the serum-collecting end adjacent to the blocking means and in contact with the opposed side walls, for interrupting fluid flow of serum through the compartment, the plug being provided with means permitting flow of blood serum to the serum collecting portion as soon as a centrifugal force which initiates separation of the serum from the blood cells is generated against the plug away from said one end. A preferred embodiment comprises the use of a thixotropic gel optionally reinforced by a mandrel as the plug, and formation of the separation device integrally with a serum dispensing chamber. Such a device can be transported from the patient, to the serum-separating station, and to the metering station without once transferring the blood or any part of it to a separate, disconnected container. Alternatively, conventional removal can be obtained such as by pour-off. Patient identification is insured.

BRIEF DESCRIPTION OF THE DRAWINGS

FIG. 14 is a perspective view of the valve shown in FIG. 11;

FIG. 15 is an elevational view of an alternate embodiment of the valve of FIG. 14;

FIG. 16 is a plan view of the valve of FIG. 15;

FIGS. 17–19 are fragmentary sectional views of a valve similar to that shown in FIG. 15, but illustrating other embodiments;

FIGS. 20–23 are sectional views similar to FIG. 11, but illustrating still other embodiments.

DESCRIPTION OF THE PREFERRED EMBODIMENTS

The invention is intended for use in the dispensing of blood sera directly from blood separators onto suitable substrates, for clinical analysis. Typical of such substrates are those shown, for example, in commonly owned U.S. application Ser. No. 538,072, entitled "Integral Analytical Element", filed by E. Pryzbylowicz et al on January 2, 1975. However, the apparatus of this invention is neither limited to use with just such substrates, nor to just the dispensing of drops of blood sera. Other fluids capable of being dispensed can also be handled by this apparatus.

As used in this application, terms such as "up" and "down" refer to the orientation of the disclosed parts during their actual use, in reference to the direction of the force of gravity.

Figure 1:
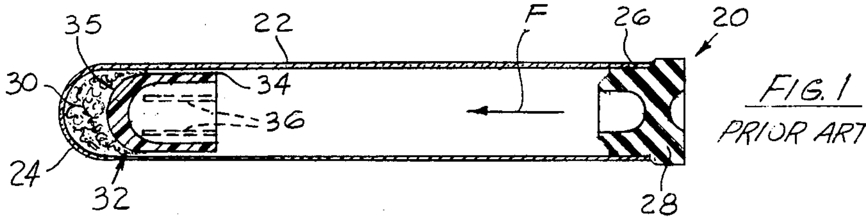
FIG. 1 is a sectional view of an evacuated serum separator constructed in accordance with the prior art.

There is illustrated in FIG. 1 a blood serum separator 20 which is typical of those prior art devices described above featuring a gel plug. In such devices, a tubular container 22, made for example from glass to permit the formation and maintenance of a vacuum, has a closed end 24, an open end 26, a septum 28 fitted into the open end, a gel 30 positioned adjacent to the closed end, and a mandrel 32 embedded in the gel, the mandrel being a cup-shaped member with its open end 34 extending towards the septum. Closed end 35 of the mandrel is adjacent to closed end 24 of the container. Typically, the gel 30 is a silical gel which can be a blend of hydrophobic silicon dioxide and a silicone. If the gel is used by itself without a mandrel, as is taught for example in the aforesaid U.S. Pat. No. 3,852,194, the silicone can be dimethylpolysiloxane, blended to give a thioxtropic gel having a specific gravity between about 1.035 and 1.06, and preferably about 1.04–1.05, and a viscosity between about 400 and about 500 poise at a shear rate of about 500 sec.$^{-1}$, and typically 451 poise at 506 sec.$^{-1}$.

Such a device operates to separate blood serum from cells in the following manner. After blood is drawn into the separator 20 by a cannula, not shown, a centrifugal force F is applied from the septum 28 towards the closed end 24. The force causes the heavier blood cells to separate from the serum and the gel to flow past the mandrel. In reaction, the lighter weight gel moves past the mandrel, assisted by optional ribs 36 thereon, towards septum 28. Because the gel has a specific gravity between that of the cells and serum, while the plastics commonly used with the mandrel have a specific gravity (1.186) greater than both, the gel moves to seal the serum-cell interface but the mandrel remains substantially where it was initially, leaving the gel seal without any structural reinforcement. A better plugging or sealing to prevent remixing of cells and serum would be achieved if the mandrel remained with the gel.

As is common in the art, the mandrel may be provided with glass beads, not shown, to aid in the clotting of the cells. This requires, however, that the sample sit in the container for about 10 minutes prior to centrifugation.

A representative separator of the above type is manufactured by Corning glass Works under the trademark "Corvac".

Figure 2A:
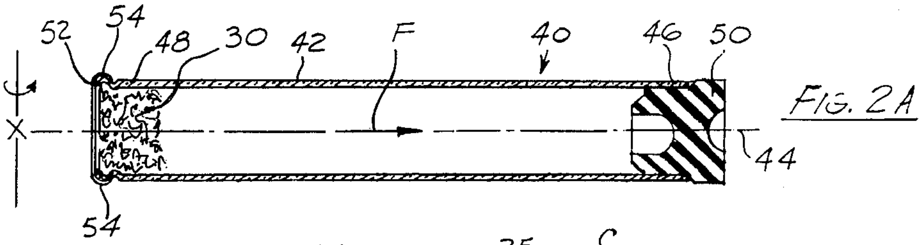
FIGS. 2A and 2B are sectional views of a serum separator constructed in accordance with the invention, the first of which illustrates the device prior to blood collection, and the second of which illustrates the device after centrifuging.
Figure 2B:
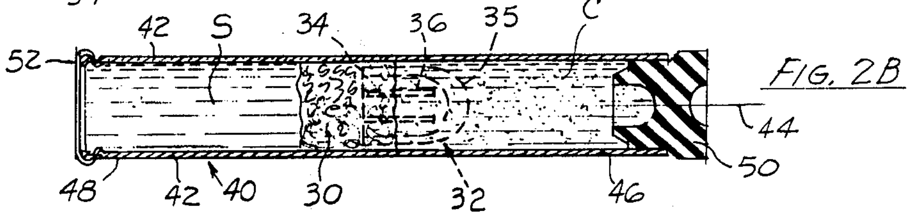
Figure 2C:
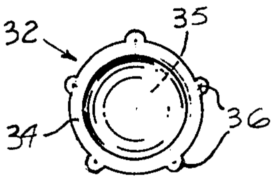
FIG. 2C is a plan view of the mandrel shown in phantom, FIG. 2B.
Figure 3:
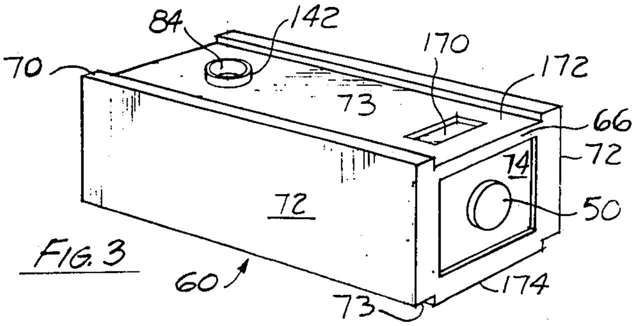
FIG. 3 is a perspective view of a unitized container of the invention within which the separator of FIG. 2 can be incorporated.

Turning now to FIGS. 2A, 2B and 2C, in accordance with one aspect of the invention, there is provided a blood serum separation device 40 having advantages over the device shown in FIG. 1. Such a device 40 comprises a generally tubular wall 42 such as can be achieved by opposed walls arranged about an axis 44 to define a blood separation compartment open at both ends 46 and 48, a closure means 50 such as a septum secured to end 46 which serves as a blood inlet, means secured to the other end 48 for temporarily blocking serum flow out of the compartment, and a movable plug comprising gel 30 substantially identical to that described for FIG. 1, disposed adjacent to the blocking means. Thus, the compartment can by any suitable shape, including cylindrical. As shown, the blocking means comprises a frangible member 52 such as a thin sheet of metal the edges 54 of which are wrapped around end 48 of walls 42. The serum can be dispensed merely by punching through the sheet, as described below. As is conventional, septum 50 can be formed from a self-sealing elastomeric material capable of penetration by the cannula used to fill the compartment.

Such a construction of device 40 permits the centrifugal force F to be applied towards the septum end, by spinning the device about a point of rotation "X" positioned adjacent end 48. The portion adjacent to end 46 becomes the cell-collecting portion of the compartment, and the portion adjacent end 48 becomes the serum-collecting portion. Member 52 permits subsequent withdrawal of the serum S out end 48 in a manner described below, rather than end 46. The gel 30 thus is initially positioned in the serum-collecting portion, where it assists member 52 in closing that end off to fluid flow prior to centrifuging, thus permitting partial evacuation of the container. Furthermore, the plug formed by gel 30 serves as means for preventing any "blood ring" from forming at the junction of the blocking means 52 with the end 48, thus preventing "blood ring contamination".

Yet another advantage of device 40 is that the gel moves with the line of force F, rather than against it, so as to permit the gel to be used without a mandrel. However, optionally the mandrel 32 of FIG. 1, shown in phantom in FIG. 2B, and in solid lines in FIG. 2C and FIG. 4, can be used. In that event, the mandrel is initially oriented with its open end 34 towards the temporary means rather than the septum, and the closed end 35 towards the septum. Although the mandrel 32 can be identical in structure with that shown in FIG. 1, its behavior during centrifuging is quite different due to the initial position of the gel and the mandrel. That is, not only is the mandrel 32 imbedded in the gel initially (FIG. 4), in the serum collecting portion, it stays imbedded in the gel as together they move with the gradually forming serum-cell interface. Such a combination gives the gel a structural reinforcement which insures that the final positioning of the plug, FIG. 2B, will in fact effectively coincide with and seal the interface against remixing of the cells C and the serum S. It is believed that the mandrel 32 does not move into the cell-collecting portion adjacent end 46 because together the gel and mandrel provide a specific gravity less than that of the cells C. Also, it appears that the spacing of the mandrel from the walls 42, and the ribs 36, are adequate to assist in the countercurrent flow of the serum S past the mandrel and gel during centrifuging, and that such flow occurs as soon as the centrifugal force F initiates separation of the serum from the blood cells.

Still another alternate embodiment within the scope of this invention is the use of plastic beads as a gel extender in lieu of the mandrel. The beads move with the gel during centrifuging.

It is not clear when the actual mechanism is for the gel-serum movement, but is is believed that, as soon as a centrifuging force F is applied, the serum when separated moves against the gel towards end 48, due to its lighter specific gravity. If a mandrel is used, the gel has nowhere else to go, except into the mandrel 32, the open end 34 of the mandrel being directed towards the gel. After the separation is complete, the flow of the serum past the plug terminates and continued spinning causes the mass of gel to spread back into contact with the wall of container 40, completing the sealing arrangement.

The structural reinforcement given to the gel by the mandrel is of particular utility when forces occur which tend to disturb the gel. One example of such forces occurs when the centrifuged sample is frozen prior to removal of the serum. Without structural reinforcement, there is a tendency of the expansion of the frozen blood cells to distort the gel seal.

By its simplicity, the device 40 is quite suitable to disposal after a single use, thus avoiding the need for sterilization between samples.

To further improve the opening of member 52, and to process and control the dispensing of the serum S in a unit container, so as to dispense it only in micro-liter drops, the processing container 60 is provided as shown in FIGS. 3–7. The container comprises a box-like frame defined by walls 72, 73 and 74, confining therein, FIG. 4, a separator-holding cavity 64 at one end 66, a mounting aperture 68 at the opposite end 70 of the frame for a plunger 110 described hereafter, and a dispensing chamber 82 located adjacent to cavity 64 between the two ends 66 and 70. Chamber 82 is in air communication with opposite exterior surfaces of the walls 73 by reason of opposed, generally aligned, apertures 84 and 86. Aperture 84 permits pressurization of chamber 82, as will become apparent, while aperture 86 permits the formation of a drop of serum in response to the pressurization of the chamber 82.

More specifically, cavity 64 comprises two pairs of opposed walls 72 and 73, end wall 74, and intermediate wall 75. Walls 75 and 74 have passageways 76 and 78 in which the separation device 40 can be inserted with serum-collecting end 48 projecting into chamber 82. To give gravity assist to the flow of serum out of device 40 when frangible member 52 is punched through, passageway 76 is centered in its wall 75 while passageway 78 is located slightly above the center line 80 of cavity 64, giving a pour-out angle of $\alpha$ which may be as large as 10°.

The dispensing chamber 82 is defined by wall 75, an opposed wall 88 in which aperture 68 is formed for plunger 110, and extensions of walls 72 and 73 which form the exterior surfaces of the frame 60. This chamber preferably incorporates those features disclosed and claimed in the commonly-owned application of R. Columbus Ser. No. 545,670, filed on Jan. 30, 1975, entitled "Metering Apparatus", and comprises the following: an end closure wall 92 with opposed faces 93 and 94, FIG. 6, a cavity 96 in face 93, the opposed side walls 75 and 88 extending from face 93 of wall 92, and a specially constructed drop-forming platform 102 isolated from the rest of face 94 of wall 92, aperture 86 being generally centered in the platform.

Because the preferred use of the invention is to dispense a plurality of drops, one at a time, for analysis, it is essential that the chamber 82 have a capacity sufficient to accommodate all the drops of serum to be tested without refilling. Specifically, due to the number of tests normally run on a single sample, the compartment preferably has a capacity which is equal to at least about 100 $\mu$ l, and preferably up to about 1000 $\mu$ l. The lower amount of this range would be used by patients having a limited blood supply, such as infants.

Figure 7:
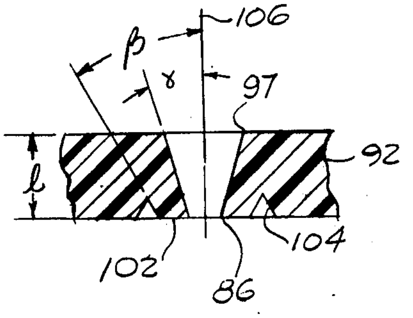

As also is disclosed in said Columbus application, the platform 102 is generally a flat surface and can be in a wall surface which is part of wall 92 but is isolated from the rest of the container by a notch or groove 104. Details such as these and others are illustrated best in FIG. 5. Alternatively, another embodiment, FIG. 6, features the formation of platform 102 as a separate wall surface joined to the wall 92 by sloped walls 108 to form a tip. In either embodiment, there preferably is a vertical separation of the platform from the face 94 by a distance $h$, and in FIGS. 4 and 5, groove 104 preferably has a minimum width $w$. Both of these preferably is such as to prevent a drop of blood sera from spreading from the platform to the remaining chamber portions prior to drop transfer. Such drop spreading would interfere with accurate drop transfer. It has been found that a suitable value for the height $h$ is about 0.127 cm, while width $w$ should be at least about 0.05 cm, and preferably about 0.127 cm. Furthermore, the surface of the walls immediately adjacent to platform 102, that is the inner walls of groove 104, FIG. 5, or the walls 108, FIG. 6, preferably slope away from a line 106 along which the force of gravity acts when the drop is formed, by an angle $\beta$ which is between about 0° and about 15°. Negative angles are also usable. Any slope greater than this will encourage the drop formed on the platform to spread up the walls into groove 104, or up the walls 108, FIG. 6, thus interfering with the proper drop size and drop removal. The surface of the platform 102 terminates in relatively sharp edges 109, which are defined by the platform surface's intersection with the walls of groove 104, or with walls 108. The surface connection provided by the walls of cavity 96 to aperture 86 may be stepped down, as in FIGS. 4 and 5, or smooth as shown in FIG. 7.

To insure that blood serum of the types commonly received from patients are properly dispensed as a drop from platform 102, in accurate micro-amounts, it has been determined further that the chamber 82 preferably has the additional following properties:

1. Aperture 86 preferably has a maximum dimension at the exterior surface of platform 102, measured transversely to fluid flow therethrough, which is less than that which will permit flow of blood serum under the influence of gravity and which is large enough to retard closure of the aperture by protein agglomeration. To perform this function with blood sera having a surface tension of between about 35 dynes/cm and about 75 dynes/cm, it has been found that the maximum dimension should be between about 0.025 and about 0.046 cm. This dimensional range appears to be operative even when the relative viscosity is as low as about 1.2 centipoises and is as high or higher then about 2 centipoises. The upper value can be increased if the head of fluid is correspondingly decreased as would be the case if the container diameter was increased. A typical head of fluid for such a maximum aperture dimension is 2.29 cm. A particularly useful embodiment is one which the aperture is generally circular in shape, with the circle diameter being 0.038 cm.

2. It is also preferred that the intersection of the aperture with the platform surface be essentially a sharp edge, i.e., having a radius of curvature no greater than about 0.02 cm. Further, the platform should be free of protrusions such as portions of flashing, which would project either away from the platform or into the fluid passageway. Without such precision in the formation of the aperture, capillary effects would be created tending to cause premature fluid flow.

3. The transition zone between platform 102 and the connecting surface such as wall 108 defines an edge 109 which preferably is sufficiently sharp as to prevent the tendency of the serum drop to climb up the wall 108 or groove 104 under the influence of surface tension. For the range of fluids anticipated, it is preferred that the maximum radius of curvature to achieve such an effect, does not exceed about 0.02 cm.

The effect of the preceding features is to confine the drop dispensed from the container 60 to the surface of the platform 102. It will be appreciated that the entire surface of the platform is contacted by the drop, and because the drop naturally assumes a quasi-spherical form, the contacted surface area of the platform will range from about 0.0026 sq. cm. for a 1$\mu$l, drop, to about 0.018 sq. cm. for a 30$\mu$l drop. This represents a range in platform diameter, between edges 109, which is between about 0.05 cm and about 0.15 cm. Alternatively, the surface area supporting, and in contact with, the drop can be increased for a given drop volume and platform diameter by either 1) forming a downwardly projecting rim around edge 109, 2) making the platform surface concave, or 3) roughening the surface of platform 102. Without such roughening, it has been found that a preferred surface smoothness is between about 1 to 30 RMS.

Figure 5:
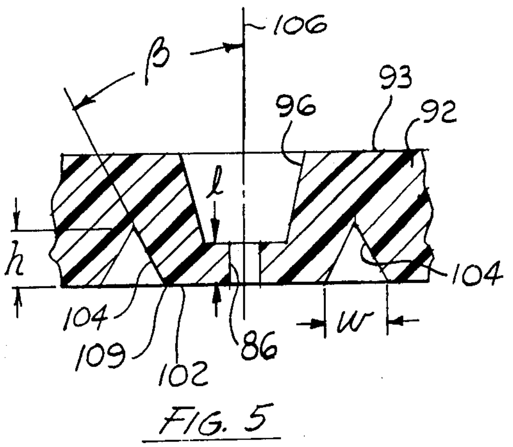
FIG. 5 is an enlarged sectional view of a portion of FIG. 4, namely of cavity 96.
Figure 6:
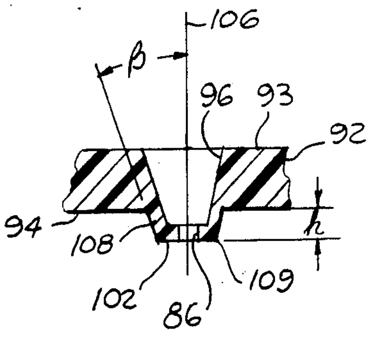
FIGS. 6 and 7 are views similar to FIG. 5 but of alternate embodiments.

To assist in drop detachment and to minimize protein agglomeration in aperture 86, the platform 102 of the embodiment of FIG. 5 preferably has a cross-sectional thickness, measured along a plane extending perpendicular through the platform, which is no greater than about 0.025 cm. A particularly useful thickness is about 0.0127 cm. The effect of such a construction is to minimize the neck of fluid connecting the drop to the main volume in compartment 82. This in turn permits rapid detachment with little secondary flow out of the container. Alternatively, FIG. 7, aperture 97 can be such as to blend into aperture 86 by a smooth wall which obviates the need for a separate wall thickness in the platform. In such a case, it is preferable that the dimension for the aperture 97 of compartment 82 be considerably greater than that of aperture 86, to avoid presenting to the serum a long constriction capable of protein agglomeration. This can be achieved by an angle $\gamma$, FIG. 7, of conversion from aperture 97 to 86 which is no less than about 5°.

All of the above features can be obtained by forming the chamber walls out of copolymers such as acrylonitrile-butadiene-styrene (ABS), and polymers such as poly(acetal), polypropylene, polystyrene, high density polyethylene, and polyesters.

Figure 4:
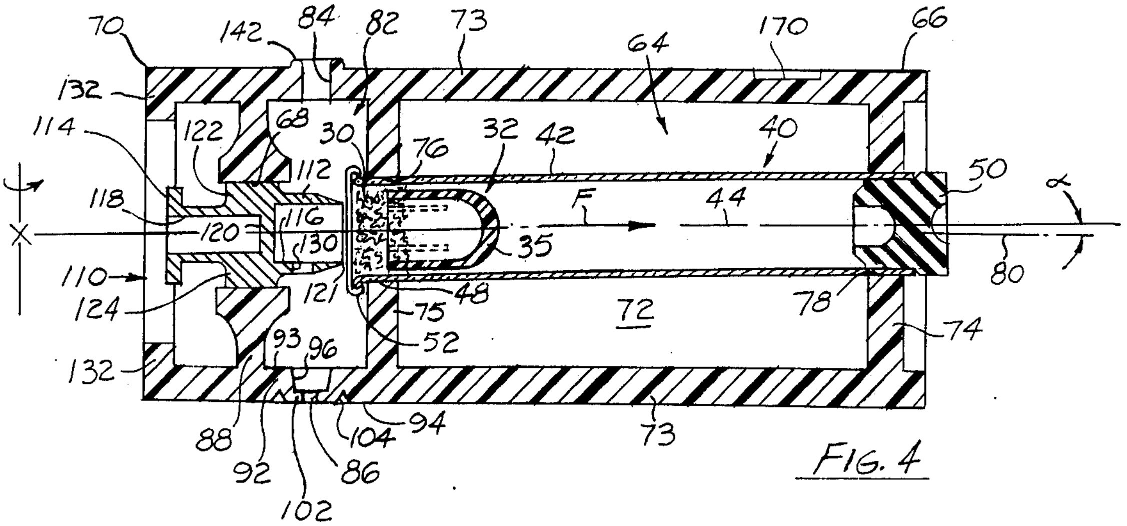
FIG. 4 is an elevational view in section of the container of FIG. 3, illustrating its orientation for centrifuging.

Considering now plunger 110, FIG. 4, it comprises a projectile-like body having opposite ends 112 and 114, each end being hollowed out to form a cavity 116 and 118, respectively, separated by a frangible portion 120. End 112 is further shaped to provide a sharp point 121. Fins 122 and 124 are provided on the sides of the plunger, dimensioned to give to the plunger a sliding fit within aperture 68 along an axis extending generally perpendicularly to sheet 52. When so mounted, portion 120 is generally parallel to frangible sheet 52, to permit by-passing of chamber 82, described below.

Cavity 116 is provided with at least one passageway 130, and the fins 122 and 124 should be keyed to aperture 68 so as to always orient passageway 130 downwardly. The end 70 of the container 60 should overhang the plunger 110, with protective lips 132, so as to protect the plunger against accidental actuation.

Figure 8:
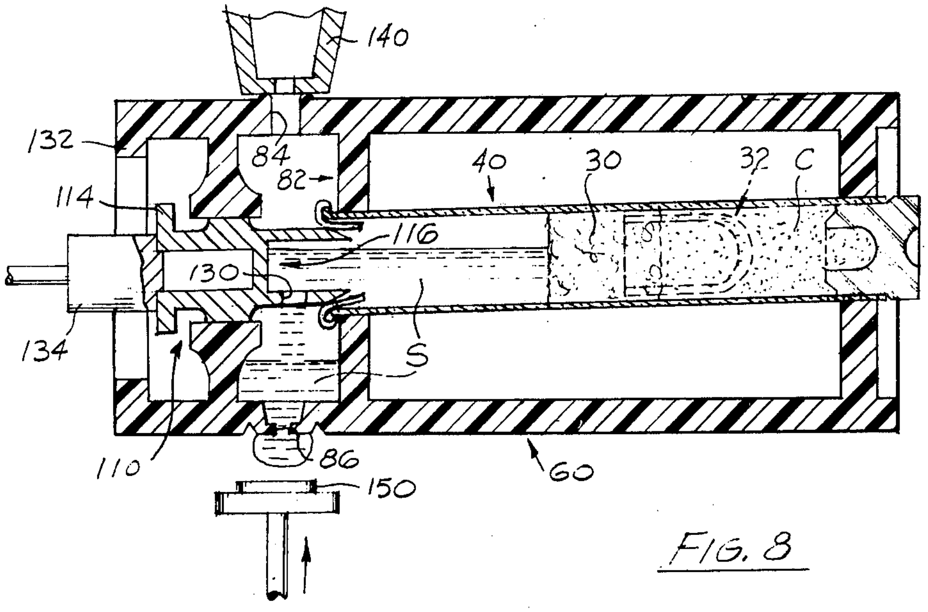
FIG. 8 is a fragmentary view similar to FIG. 4, but illustrating the use of the container to dispense the serum after centrifugal separation.

In operation, FIG. 8, the plunger 110 is displaced inwardly by impinging end 114 with an implement 134 having sufficient force to cause frangible member 52 to break and open under the impact. Alternatively, the plunger can be actuated by hand. The serum S then pours out of the separation device 40 into cavity 116, through passageway 130 and into the chamber 82 where the constriction at aperture 86 impedes further flow. Cells C are retained in device 40 by plug 30. Pressurization of chamber 82 is achieved by placing in sealed position over aperture 84 a source of air pressure 140. Sealing is achieved by means such as a rib 142. Sufficient increase in pressure is provided by source 140 within chamber 82 as to form a single drop of serum on the platform. A suitable substrate 150 can then be raised into position to remove the drop for clinical analysis. Preferably, after each drop, chamber 82 is vented to the atmosphere, such as by lifting source 140 from aperture 84, to permit the use of a uniform pressurization for subsequent drop dispensing.

As reported in the aforesaid Columbus application, it has been found that a chamber 82 constructed as described above, when the contents are appropriately pressurized, repeatedly will give unifom volumetric drops of biological fluid, such as blood sera, even when the relative viscosity, surface tension and total protein content varies drastically as is characteristic of blood sera drawn from diseased as well as healthy patients. Table 1 sets forth typical results in the dispensing of a variety of biological fluids. "X" represents the arithmetic mean, while "COV" is the coefficient of variation as is commonly used in statistical analysis. The variation of only about 2% from the mean insures that repeated drops have about the same volume. This accuracy is achieved not only for blood serum, but also for other biological fluids such as Ringer solutions and water. Such control of volume is essential to insure that the same potential for the tested component exists in each drop.

Table 1

COMPARATIVE SUMMARY OF SEVERAL BIOLOGICAL FLUIDS

| Test Fluid | Proteinaceous Solutions | | | Non-Proteinaceous Solutions | |
|---|---|---|---|---|---|
| Describing Parameter | Blood Sera | Calibrated Reference Serum | Ion-Free Calibrated Reference Serum | Triple Distilled $H_2O$ | Ringer Solution |
| Surface Tension (dyn/cm) | 44–63 | 45.8 | 61.0 | 70.0 | 66.2 |
| Relative Viscosity (CP) | 1.2–1.9 | 1.5 | 1.7 | 1.0 | .91 |
| Total Protein (gm/100 ml) | 4.1–11.8 | 7.1 | 5.77 | 0 | 0 |
| Data Points | 225 | 15 | 10 | 10 | 10 |
| SPOT AREA | | | | | |
| X ($\mu m^2$) | 87.3 | 87.3 | 89.3 | 111.0 | 104.4 |
| COV ( % ) | 2.2 | 1.9 | 1.4 | 1.9 | 2.6 |
| SPOT VOLUME | | | | | |
| X ($\mu m^2$) | 10.2 | 10.2 | 10.5 | 13.1 | 12.3 |
| COV ( % ) | 2.2 | 2.0 | 1.4 | 2.0 | 2.7 |

In the preceding table, the blood sera was obtained from whole blood samples taken on a random basis from various human patients. The Ringer Solution was isometric 0.9% NaCl in water. The "calibrated reference serum" was "Versatol", provided by General Diagnostics, a division of Warner-Lambert Co. The assay for "Versatol" serum is given in Table 2.

Table 2

| "Versatol" Serum Constituent | Amount |
|---|---|
| Bilirubin | 0.5 mg/100 ml |
| Calcium | 10.2 mg/100 ml |
| Chloride | 103 mEq/L |
| Cholesterol, total | 170 mg/100 ml |
| Creatinine | 1.7 mg/100 ml |
| Gluclose[1] | 81.0 mg/100 ml |
| Iron | 143 mcg/100 ml |
| Magnesium | 2.2 mg/100 ml |
| Phosphorous, inorganic | 4.0 mg/100 ml |
| Potassium | 5.0 mEq/L |
| Protein Bound Iodine | 7.2 mcg/100 ml |
| Sodium | 140 mEq/L |
| TIBC | 397 mcg/100 ml |
| Total Nitrogen | 1192 ml/100 ml |
| Total Protein[2] | 7.1 gm/100 ml |

Table 2-continued

| Constituent | "Versatol" Serum Amount |
|---|---|
| Urea Nitrogen | 12.2 mg/100 ml |
| Uric Acid | 3.3 mg/100 ml |

[1]Actual glucose recovered by methods such as glucose oxidase or Nelson-Somogyi.
[2]Calculated as [(Total Nitrogen)-(Non-protein nitrogen)] × 6.25.

The ion-free calibrated reference serum was "Chemvarion", produced by Clinton Laboratories. Table 3 sets forth the assay for this test fluid.

Table 3

"Chemvarion"

| Constituent | Range Found (per 100 ml) | Mean (per 100 ml) |
|---|---|---|
| NPN | N.A. | 36 mg |
| Total Nitrogen | N.A. | 960 mg |
| Total Protein | (TN-NPN) × 6.25 | 5.77 gms |
| Protein-bound Iodine | 2.5–2.8 mcg | 2.65 mcg |
| Cholesterol | 135–149 mg | 142 mg |
| Iron, Total | 79–106 mcg | 92 mcg |
| Magnesium | N.A. | nil |
| Copper | 34–43 mcg | 39 mcg |
| The following determinations were made by adding back pure standard concentrates in recovery experiments | | |
| Sodium | — | nil |
| Potassium | — | nil |
| Calcium | — | nil |
| Chloride | — | nil |
| Urea Nitrogen | — | nil |
| Uric Acid | — | nil |
| Phosphorus | 0.1–0.3 mg | 0.2 mg* |
| Glucose | — | nil |
| Creatinine | — | nil |
| Lithium | — | nil |

*Probably protein-bound and liberated during determination.

Figure 9:
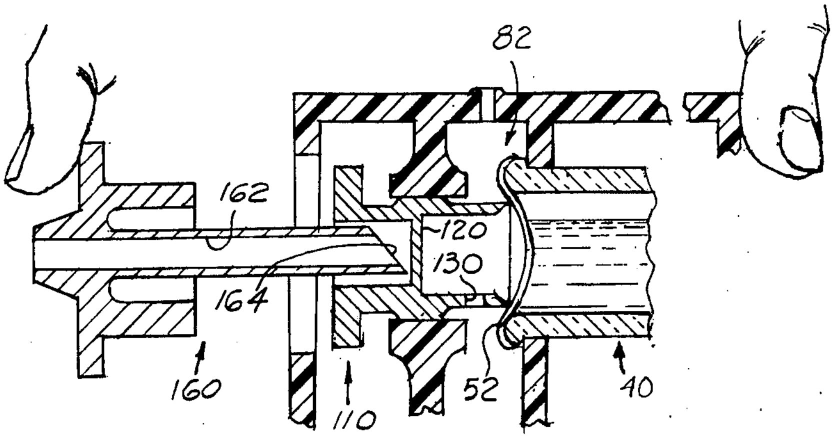
FIG. 9 is a fragmentary sectional view similar to FIG. 8, but illustrating the pour-off override mechanism.

To permit pour-out of serum without going through dispensing chamber 82, a pour-out tube 160 can be forced through frangible portion 120, as by hand, FIG. 9. Such a tube has a passageway 162 extending its length, and a sharp, pointed end 164. As the tube is forced through portion 120 and sheet 52, it carries plunger 110 sufficiently far into end 48 of separation device 40 so as to cover passageway 130. The serum S exits then through passageway 162.

Container 60 preferably is used for the entire sequence of blood collection, centrifuging, and dispensing. Thus, the blood stays with the same container for its entire processing. The centrifuging requires that it be spun about a point "X", FIG. 4, delivering a force F along axis 44.

To permit patient identification of the container 60 for this entire processing, a label 170 can be provided on, or recessed into, any exterior surface. To permit ready stacking of the container, and/or machine handling, opposite walls 73 are formed one with a groove 172 and the other with a rib 174, both extending the full length of the container. As is apparent, the size and shape of the groove and rib should be such as to permit then to mate with a rib or groove, respectively, of a second container.

It will be appreciated that container 60 can be used to dispense single-phase biological fluids from container 40, merely by removing the gel 30 and the mandrel 32, if used, from the compartment defined by walls 42 prior to collection of the fluid.

VALVED CONTAINER

Turning now to the remaining Figures, there is illustrated an alternate embodiment for the blood separation device and serum dispenser wherein all the parts can be integrated into a single, unitized body, and the temporary blocking means is replaced by a valve. As used in this application, the term "valve" means a member by which the flow of fluid through a passageway may be blocked, permitted, or otherwise regulated by a movable part that shuts, opens, or partially obstructs, respectively, the fluid flow. Such a member is in contrast to the frangible member of the previous embodiment, inasmuch as a valve can be reclosed after it is opened.

Parts similar to those previously described bear the same reference number to which the distinguishing suffix *a* has been added.

Figure 12:
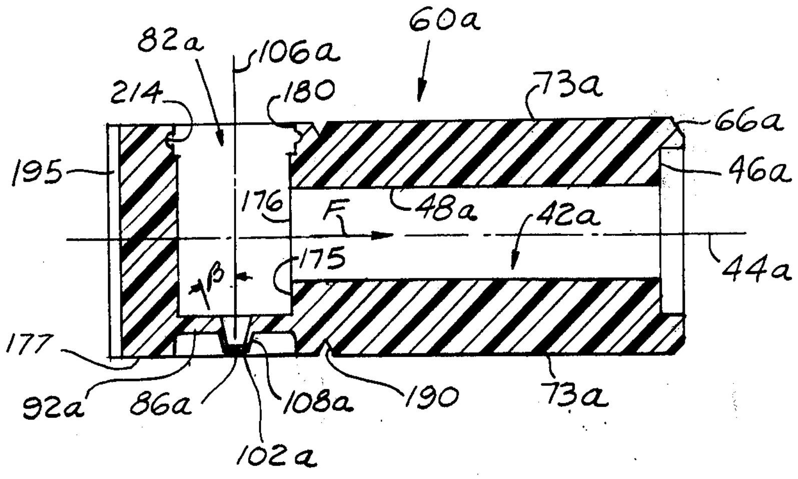
FIG. 12 is a sectional view similar to FIG. 11, but without the valve.
Figure 10:
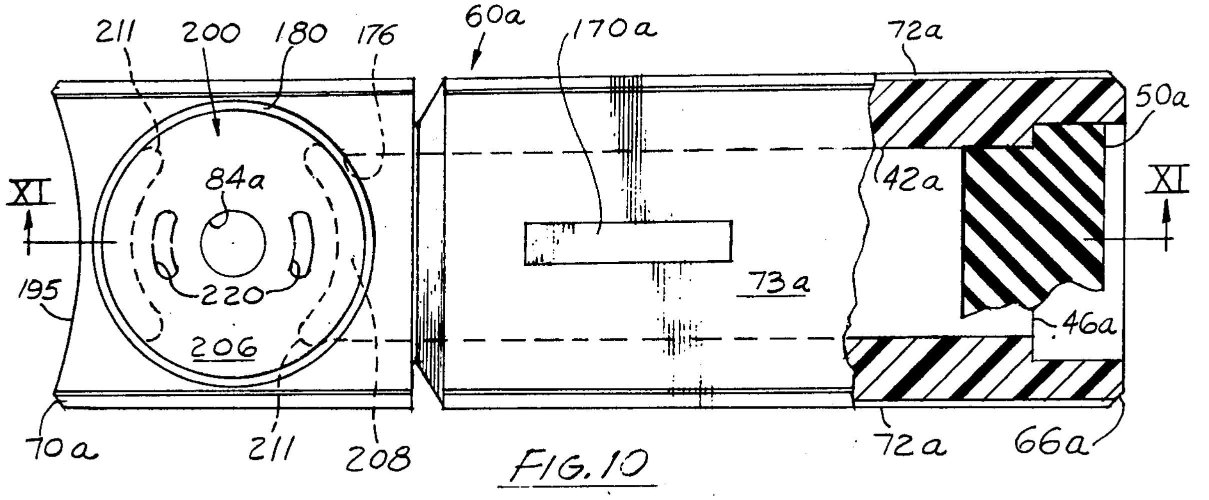
FIG. 10 is a partially broken away plan view of an alternative embodiment of the container.
Figure 11:
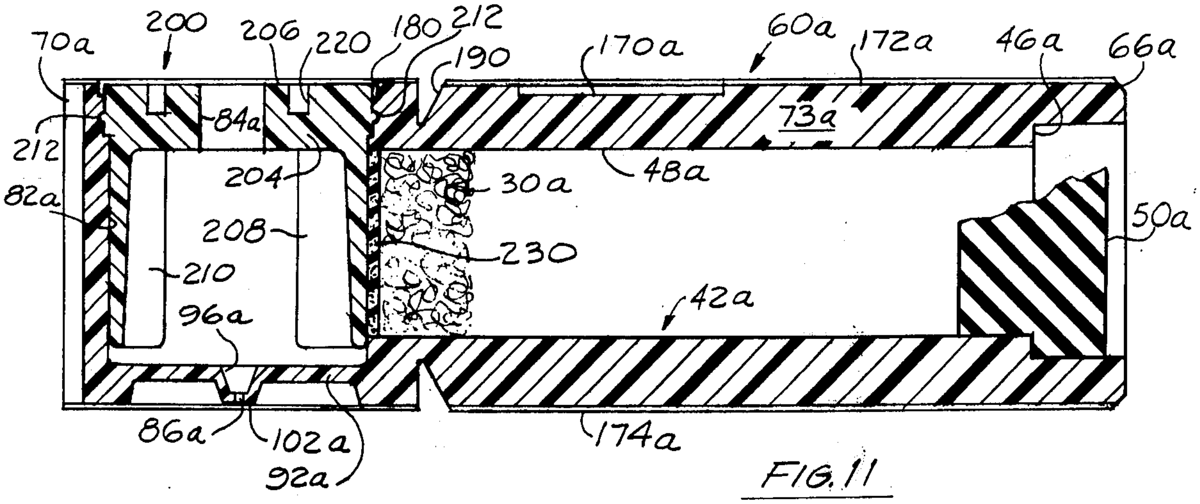
FIG. 11 is a sectional view, partially broken away, generally taken along the line XI—XI of FIG. 10.
Figure 13:
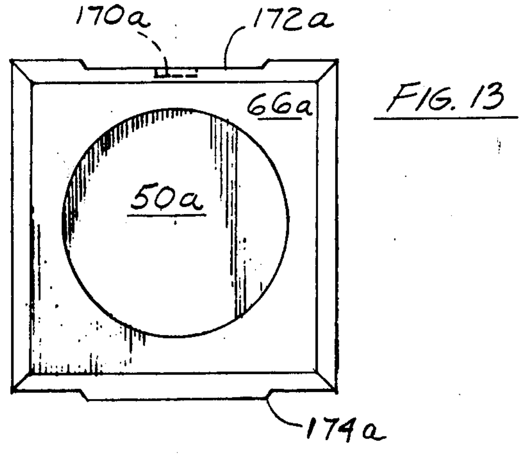
FIG. 13 is an end elevational view of the container of FIG. 10.

Thus, as best seen in FIGS. 10–12, a unitized processing container **60*a* is provided, comprising a body having two opposite ends 66*a* and 70*a*, and exterior opposed walls 72*a* and 73*a*. Extending into the container 60*a* from end 66*a* is a blood separation compartment 42*a*, open at both ends and having a generally tubular shape with an axis 44*a*, FIG. 12. The outer end 46*a* of compartment 42*a* can be enlarged to accommodate a septum 50*a* permanently secured thereto. Compartment 42*a* terminates in inner end 48*a* at a locator surface 175, FIG. 12, which coincides with the walls of a second compartment or dispensing chamber 82*a* to define a passageway 176 between the two compartments. Chamber 82*a* has a longitudinal axis 106*a* extending generally perpendicular to axis 44*a*. As in the previous embodiment, a movable plug 30*a* is positioned in the serum-collecting end 48*a* of compartment 42*a*, and may optionally include a mandrel 32*a*, FIG. 20. Preferably, the plug 30*a* comprises a gel, the nature of which is the same as in the previously discussed embodiment, FIG. 4, as is the mandrel if used. As is seen in FIG. 12, the centrifugal force F is again applied against the plug 30*a* towards the end 46*a* accommodating the closure means 50*a***.

Chamber **82*a* extends from an opening 180 in wall 73*a*, past passageway 176 to a second locator surface defined by an end wall 92*a*. Generally centered in the end wall is a cavity 96*a* defining a third compartment in fluid communication, FIG. 12, with the other two compartments. Wall 92a is further provided with a platform 102*a* which is here shown as joined to wall 92*a* by sloping walls 108*a* as in FIG. 6. The wall 92*a* and its platform 102*a* preferably are recessed with respect to a ridge 177 surrounding the platform, to protect the surface of the platform from contamination. Alternatively, the platform may be constructed as shown in either FIGS. 5 or 7. Regardless of the form of the cavity 96*a*, the chamber 82*a*, and particularly the platform 102*a*, aperture 86*a*, and angle $\beta$, FIG. 12, have the same properties and values as enumerated in detail in the previous embodiment, except that the platform 102*a* can be recessed with respect to the ridge 177**.

The exterior surfaces of the container **60*a* can have the same additional features as shown in the embodiment of FIG. 4. That is, a patient identification marker 170*a* can be placed on an exterior surface, and groove 172*a* and rib 174*a* can be formed along the full length of opposed walls 73*a*. Any suitable mating shape can be used for the groove and rib. In addition, a notch 190 extends circumferentially around the container 60*a***, concentric with axis 44*a*, FIG. 12, the notch being located generally in alignment with the gel 30*a*, and extending toward compartment 42*a*. The function of the notch is to permit the container 60a to be broken by snapping off the chamber 82*a*. In the manner, serum obtained in compartment 42*a* can be poured off, or otherwise aspirated away, without requiring drop-by-drop dispensing through chamber 82*a*.

A concave surface 195, FIG. 10, can be provided in end wall 70*a* for the purpose of ready identification and for machine centering or handling of the container, if desired.

To control the flow of serum from compartment 42*a* into compartments 82*a* and 96*a*, blocking means in the form of a valve 200 is seated within chamber 82*a*, having a portion removably blocking passageway 176. More specifically, to obtain selective flow of serum from compartment 42*a*, the valve comprises, FIG. 14, a body 204 having a face plate 206, a valve stem 208 extending from body 204, and a supporting leg 210 also extending from the valve body at a position generally opposite to stem 208. The stem and leg are spaced apart by an opening 211 which is at least as large as passageway 176, FIG. 10.

The body's exterior surface is designed to mate within chamber 82*a*. Thus a preferred shape of chamber 82*a* and body 204 is generally cylindrical. The valve is further mounted for rotation within chamber 82*a* about axis 106*a*, FIG. 12, a circumferentially-extending rib 212 in body 204 being provided to rotate within a mating groove 214 in chamber 82*a* (FIG. 12). To permit pressurized air to be delivered into valve 200 and thus into chamber 82*a*, an aperture 84*a* extends through plate 206. A suitable interface, such as a rib, can be provided as a seal in a manner similar to the embodiment of FIG. 8. To provide a rotary drive for valve 200, at least one, and preferably two, cavities 220 are formed in plate 206 to mate with a driving member, the cavities being offset from axis 106*a*.

As means for sealing off the passageway 176, the stem 208 is provided with a closure member 230 projecting radially outwardly away from the valve, of a shape and size as to fit into and close the passageway. To permit opening of the valve merely by rotating body 204, the member 230 is preferably flexible enough as to be compressed by such rotation, whereby it will clear the wall of chamber 82*a* just outside of passageway 176. Typical materials having such properties include foamed or solid elastomers, such as silicone rubber, which may be adhered as by suitable adhesives directly onto the stem.

To bias the closure member against passageway 176, it is preferred that the stem 208 and leg 210 be formed so as to project outwardly a distance which is slightly larger than the diameter of chamber 82*a*, whereby the stem and leg are pressed together when the valve 200 is forced into the chamber. Alternatively, leg 210 may extend generally perpendicularly to face plate 206, as seen in FIG. 15.

By the above means, a sufficient seal is provided for passageway 176 as to permit compartment 42*a* to be at least partially evacuated, if desired, and maintained in this condition prior to use. Blood may easily be drawn into such evacuated compartment when a cannula is inserted into septum 50*a*.

FIGS. 15 and 16 illustrate an alternate embodiment of the valve, wherein the closure member protruding from stem 208 has been eliminated. Valve parts similar to those previously described bear the same reference numeral to which the distinguishing suffix *a* has been added. Thus, valve 200*a* has a body 204*a*, a face plate 206*a*, a stem 208*a* and a supporting leg 210*a*, as before. However, in place of the closure member, the stem itself is molded so as to project even further away from the body 204, and is further provided adjacent to the juncture of the stem with the body, with wings 240 which flare outwardly from the body. The flexibility of the wings 240 and of the stem are sufficient to permit the valve 200*a* to be compressed and forced into chamber 82*a*, where the compressive forces act to uniformly load and seal the stem against passageway 176.

FIGS. 17–19 illustrate still other embodiments of the invention wherein yet other means are provided for selectively sealing passageway 176. Parts similar to those previously described bear the same reference numeral, to which the distinguishing suffixes *b*, *c*, and *d* are applied. Thus, in FIG. 17, valve 200*b* is constructed as in FIG. 14, except that closure member 230*b* comprises a flexible grommet inserted into an aperture 250 formed in stem 208*b*. The grommet's size is such as to block passageway 176 when it is aligned, by rotation of the valve, with the passageway. In FIG. 18, valve 200*c* comprises a ball 256 held in aperture 250*c* by a clip 258, one end 260 of which is secured over the end of stem 208*c*. Either the ball or the clip, or both, is sufficiently resilient as to permit the ball to be forced out of passageway 176 when the valve is rotated to its open position. In FIG. 19, the valve 200*d* is constructed as in the embodiment of FIG. 14, there being however, no protruding closure member on stem 208*d*. Instead, a coating 270 of an adhesive capable of being activated by ultraviolet exposure, is coated over the exterior surface of the stem, so that passageway 176 can be sealed after the stem is positioned thereacross. Typical of the adhesives which can be used as acrylic-modified urethane resins having unreacted isocyanate groups comprising at least about 2.0% by weight of the resin. The adhesive disclosed in British Pat. No. 1,147,732 is also believed to be suitable.

In addition to the readily apparent advantages of valve 200, yet other advantages are that it provides a maximum or enhanced flow of serum through passageway 176 into chamber 82*a*. That is, the opening 211 between the stem 208 and leg 210, in all the valve embodiments, is as large as the passageway 176 (FIG. 10), and therefore as large as the diameter of compartment 42*a*. Also, the valve can be reclosed after the serum passes into chamber 82*a*, so as to present a smaller volume of air which has to be pressurized as by a device such as source 140 of the previous embodiment.

The above construction permits the container 60*a* to be used as an evacuated container, the same unitized body functioning first as the blood collector, then the separator, and lastly the dispenser, all without requiring transfer to a separate container. In addition, it is contemplated that the blood can be collected without first providing a partial vacuum in compartment 42*a*, and further that an air vent or aperture 300 can be formed in wall 73*a*, FIG. 20, to avoid air-buildup as blood is forced into compartment 42*a*. To prevent leakage of serum out of the hole, while still permitting air flow, the vent 300 can either be filled with air permeable material, not shown, such as a liquid-impermeable membrane, or a cellular material the pores of which will readily plug when serum flows into it. Such pores, which provide the effective air passageways, should be sufficiently small as to resist blood flow therethrough under the radially outward pressure commonly encountered during centrifuging. Such pressures have been found to be, for example, about $1.245 \times 10^5$ dynes per square centimeter. Alternatively, the vent may be cut on a diagonal axis which is non-rectilinear to the compartment axis, as shown in phantom, rather than a radius, to further discourage blood leakage during centrifugation. Still further, the plug 30*a* can prevent leakage by strategically locating the inner end 302 of the vent which opens into compartment 42*a*. That is, the blood drawn into the container will normally have a serum content occupying a space having a length between about 35 and about 60% of the free length of compartment 42*a*, thus insuring that the plug 30*a* will move to this position. still further, exterior covers, such as tape, can be positioned after the sample is drawn, to prevent leakage.

The container 60*a* as described above can be made of synthetic rigid polymers, or "plastics". If compartment 42*a* is to hold a vacuum, a relatively non-porous synthetic polymer is preferred, such as "Saran" vinyl chloride-vinylidene chloride copolymer manufactured by Dow Chemical Company.

It will be appreciated that, by reason of the above construction, the container 60*a* can have a minimal size, and can be formed of materials such as various plastics which will permit it to be disposed of, after a single use. A typical length of the container would be, from end 66*a* to end 70*a*, only about 5.85 cm. This can be shortened if, for example, a retest container is to be supplied, because in that case the serum will already be separated and plug 30*a* can be eliminated. Such a container could also be used to dispense biological fluids other than serum. Even if a non-plastic surface for the walls of compartment 42*a* is required for any reason, a cylindrical liner, such as a glass sleeve, can be readily incorporated.

A further advantage found with the devices described above is that the delay required for coagulation can be reduced below that necessary in using devices such as those shown in FIG. 1.

Yet another advantage of the container 60*a* is that it will readily fit within conventional centrifuges and/or syringes without requiring the redesign of this related equipment.

Figure 21:
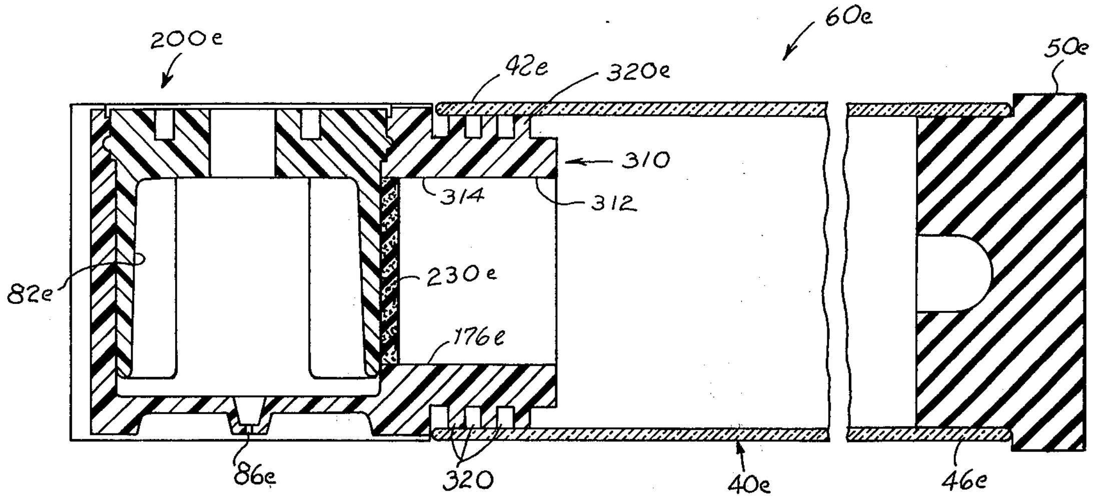
Figure 22:
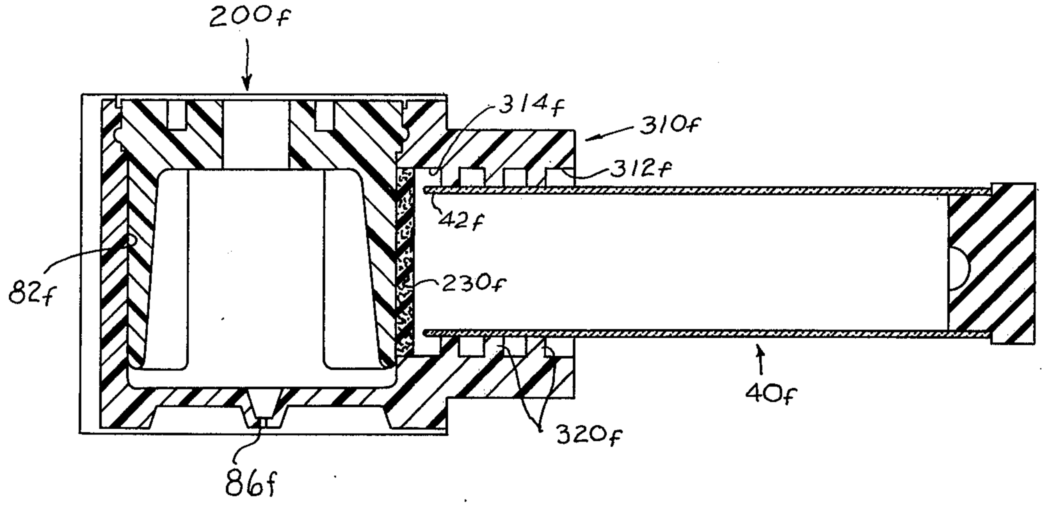

It will be appreciated that the valve and dispensing chamber along with its platform, can be combined to form a detached device which can be readily inserted into or mounted over a serum container after the serum is separated from the blood cells, or combined with a container provided with serum in any fashion. These embodiments are illustrated in FIGS. 21 and 22. Parts similar to those previously described bear the same reference numeral to which the distinguishing suffixes *e* and *f* have been added. Thus, FIG. 21, the processing container 60*e* comprises a serum separation tube 40*e* open at both ends, a septum 50*e* closing one of the ends at the blood inlet and cell collecting portion adjacent end 46*e*. At the serum-collecting portion adjacent end 42*e*, a dispensing apparatus has been inserted, either before or after serum centrifuging, to permit dispensing of the serum. The details of the dispensing chamber 82*e*, the valve 200*e* and the platform 86*e* are the same as described for the preceding embodiments. The whole assembly fits into end 42*e* by means of a neck portion 310 having an end 312 which telescopes well into the end 42*e*, and an end 314 adjacent valve 200*e*. The serum passageway 176*e* traverses neck portion 310 from end 312 to end 314, which is blocked by closure member 230*e*. To seal the neck portion and the entire dispensing apparatus within tube 40*e*, ribs 320 project from the neck portion into contact with the tube.

Alternatively, FIG. 22, the chamber 82*f* containing the valve 200*f* and the neck portion 310*f* can be mounted over the exterior of the tube 40*f* so that end 42*f* of the container fits within the neck adjacent end 314*f*. The only change necessary is of course to mount the sealing ribs 320*b* on the inside of the neck portion 310*f*, rather than the outside.

These embodiments can be preassembled before use, in which case the ribs must fit tight enough to the tube to permit air evacuation of the tube. The phase separation gel (not shown) is then inserted adjacent the closure member 230*e* or *f* of the valve. In such a case use of container follows substantially the same procedure as described for previous embodiments. Operation of the valve and dispensing chamber also would be exactly as described above.

Other suitable modifications of the previous embodiments include any suitable means to augment the serum separation or the flow of serum from the separation compartment to the dispensing chamber when the valve is open. For example, increased surface area in the walls of the separation compartment will increase the speed of clotting prior to serum separation. Also, the septum end of the container can be tilted up at the dispensing station to augment serum flow.

Figure 23:
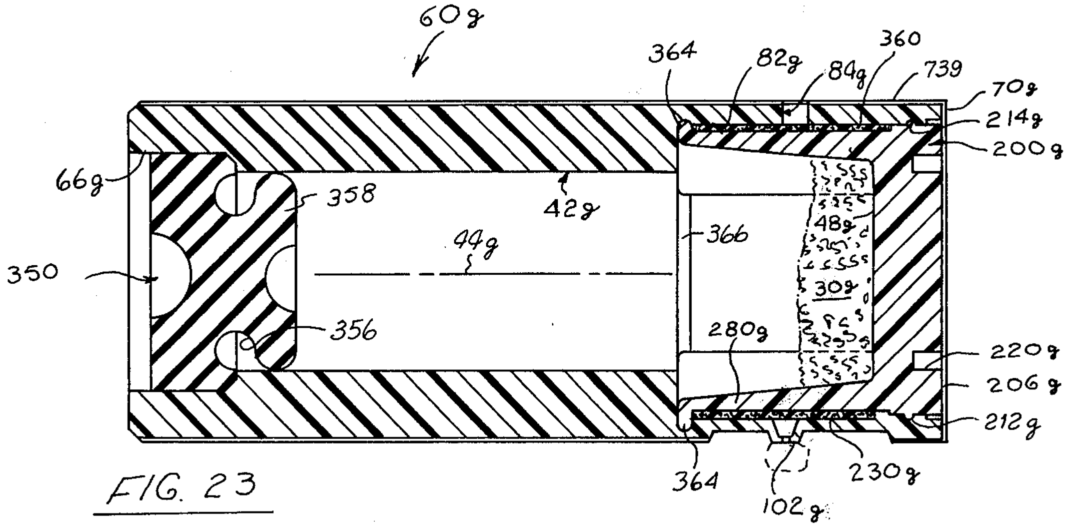

Turning now to FIG. 23, there is illustrated an integral embodiment in which the rotatable valve is positioned to rotate about an axis parallel to or coincident with the axis of the serum separation tube. Parts similar to those previously described bear the same reference numeral to which the distinguishing suffix *g* has been added.

A unitized container 60*g* is provided with a serum separation compartment 42*g* having an axis 44*g*, the compartment end 48*g* inclusive, in this case, of the interior of the dispensing chamber 82*g*. An improved septum 350, described hereinafter, is positioned at body end 66*g*, while the rotatable valve 200*g* fits within chamber 82*g*. The valve is identical to that described previously, except for the modifications necessary to permit it to rotate about an axis parallel to axis 44*g*. Thus, the rib 212*g* mates with a groove 214*g* in end 70*g* of the unit, rather than in the top portion. Pressurizing aperture 84*g* is formed in the wall 73*g* of container 60*g*, rather than in the plate 206*g* of valve 200*g*. Means 360 are then provided on leg 210*g* to seal off aperture 84*g* until the valve is rotated, and such means can be a closure member identical to closure member 230*g* mounted on valve stem 208*g*, as described in the previous embodiments. Closure member 230*g* serves in this embodiment to temporarily block or seal off the dispensing platform 102*g*, and wall 92*g* from which the platform depends may be recessed to accommodate member 230*g*. To assist in providing a vacuum seal, the stem 208*g* and the leg 210*g* each have a rib 364 protruding away from the valve body, and a mating groove 366 is formed in the walls of compartment 42*g* to receive the ribs.

In operation, the partitioning gel 30*g* is located inside the chamber 82*g* and between the valve stem and valve leg, adjacent to valve plate 206*g*, prior to centrifuging, so that chamber 82*g* is used to accommodate part of the sample as collected and at least a portion of the serum after centrifuging. The gel 30g is again positioned in the serum-collecting portion adjacent compartment end 48g. As before, the centrifugal force is applied along axis 44g from the chamber 82g toward end 66g, causing the gel to move out of chamber 82g into compartment 42g where it separates the serum from the blood cells. This provides the advantage of shortening the overall length of the container 60g. Dispensing of separated serum is achieved by rotating the valve 200g and pressurizing the interior of chamber 82g through aperture 84g, as described for the preceding embodiments.

Figure 24:
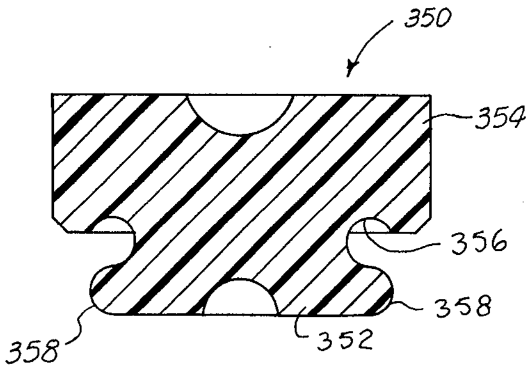
FIG. 24 is a sectional view of the improved septum of FIG. 23.

Septum 350, FIG. 24, which can be used in any of the embodiments of the invention, is provided with means to improve its sealing performance, particularly during centrifuging. That is, as with conventional septums it has a neck portion and a head portion 354. However, the junction of the neck and head portions features an annular undercut or groove 356 extending the entire circumference of the septum. This groove permits the formation of a more flexible lip 358 in neck portion, and therefore extra sealing power against the inner wall of compartment 42g, insuring that the seal will be maintained when the vacuum is drawn on the body 60g, and when the centrifuge force is directed against the septum in a direction tending to force the septum out.

It will be appreciated that the embodiment of FIG. 23, wherein valve 200g rotates about axis 44g, can also be used as a detached dispensing chamber adapted for insertion into or over a serum-containing compartment or tube in the manner shown in FIGS. 21 or 22, before or after centrifuging.

The invention has been defined in detail with reference to certain preferred embodiments thereof, but it will be understood that variations and modifications can be effected within the spirit and scope of the invention.

What is claimed is:

1. A blood serum separation device, comprising opposed walls arranged about an axis to define a blood separation compartment having a blood inlet portion, a serum collecting portion and a blood cell-collecting portion, the serum-collecting portion being adjacent one end of the compartment, at least one of said walls being provided with a venting aperture having a maximum effective diameter of air flow which is less than that which will permit blood to flow therethrough under a pressure of about $1.245 \times 10^{-5}$ dynes/cm$^2$;

means for temporarily blocking flow of serum out of said one compartment end;

and a movable plug positioned transversely across said compartment, and in said serum-collecting portion adjacent to said blocking means and in contact with the walls of said compartment around the entire perimeter of said walls, for interrupting fluid flow of serum through the compartment, said plug comprising an inorganic thixotropic polymeric gel which is inert to the serum, whereby flow of blood serum to said serum collecting portion occurs when a centrifugal force sufficient to initiate separation of the blood serum from the blood cells is generated against the plug away from said one end.

2. The device as defined in claim 1 wherein said aperture is spaced from said blocking means along said axis at a distance corresponding to between about 35 and about 60% of the total free length of said compartment.

3. A blood serum separation device, comprising opposed walls arranged about an axis to define a blood separation compartment having a blood inlet portion, a serum collecting portion and a blood cell-collecting portion, the serum-collecting portion being adjacent one end of the compartment, at least one of said walls being provided with a venting aperture having a longitudinal axis which is non-rectilinearly inclined with respect to said compartment axis, for air flow through said walls, means for temporarily blocking flow of serum out of said one compartment end;

and a movable plug positioned transversely across said compartment, and in said serum-collecting portion adjacent to said blocking means and in contact with the walls of said compartment around the entire perimeter of said walls, for interrupting fluid flow of serum through the compartment, said plug comprising an inorganic thixotropic polymeric gel which is inert to the serum, whereby flow of blood serum to said serum collecting portion occurs when a centrifugal force sufficient to initiate separation of the blood serum from the blood cells is generated against the plug away from said one end.

4. A blood serum separation device, comprising opposed walls arranged about an axis to define an elongated blood separation compartment having opposite ends, a serum-collecting portion adjacent one of said ends, and a blood cell-collecting portion adjacent the other end of the compartment;

means, located at said one compartment end, for temporarily blocking flow of serum out of said one compartment end, said means including a valve capable of permitting selective flow of serum, said valve including a valve stem on which said closure member is mounted, a supporting leg, a flexible closure member projecting outwardly away from the valve, said closure member having a shape and size as to close said one end when pressed thereagainst, and sufficient flexibility as to permit compression of the member whereby the closure member can be forced out of said one end, and means for biasing said closure member against said one end;

and a movable plug positioned transversely across said compartment, and in said serum-collecting portion adjacent to said blocking means and in contact with the walls of said compartment around the entire perimeter of said walls, for interrupting fluid flow of serum through the compartment, said plug comprising an inorganic thixotropic polymeric gel which is inert to the serum, whereby flow of blood serum to said serum collecting portion occurs when a centrifugal force sufficient to initiate separation of the blood serum from the blood cells is generated against the plug away from said one end.

5. The device as defined in claim 4, wherein said biasing means includes a chamber adjacent to said serum-collecting portion, in which said valve is positioned, the walls of the chamber having a maximum dimension which will accommodate said valve only when said stem and said leg are pressed together.

6. The device as defined in claim 5, wherein said chamber is a dispensing chamber one of walls of which has a passageway fluidly connecting said chamber to said compartment, said passageway being selectively blocked by said valve, said chamber having a platform at one side thereof suitable for the formation of drops, said platform being provided with an aperture permitting forced fluid flow of serum from the interior of the chamber, the maximum dimension of the aperture being sufficiently small as to prevent flow of the serum under gravity.

7. A blood serum separation device, comprising opposed walls arranged about an axis to define a blood separation compartment having a blood inlet portion, a serum collecting portion and a blood cell-collecting portion, the serum-collecting portion being adjacent one end of the compartment;

means for temporarily blocking flow of serum out of said one compartment end;

a movable plug positioned transversely across said compartment, and in said serum-collecting portion adjacent to said blocking means and in contact with the walls of said compartment around the entire perimeter of said walls, for interrupting fluid flow of serum through the compartment, said plug comprising an inorganic thixotropic polymeric gel which is inert to the serum, whereby flow of blood serum to said serum collecting portion occurs when a centrifugal force sufficient to initiate separation of the blood serum from the blood cells is generated against the plug away from said one end, and a dispensing chamber fluidly connected to said compartment by a passageway selectively blocked by said blocking means, said chamber having a platform fluidly connecting the chamber to said compartment, said passageway being selectively blocked by said frangible member, and a plunger slidably mounted within said chamber and aligned generally perpendicularly with respect to said frangible member, said plunger terminating in a point sufficiently sharp as to penetrate said frangible member when pushed thereagainst by hand.

8. A blood serum separation device, comprising opposed walls arranged about an axis to define a blood separation compartment said compartment having opposed ends, a serum-collecting portion adjacent one compartment end, and a cell-collecting portion adajcent the other end;

closure means for closing said other end;

means for temporarily blocking flow of serum out of said one compartment, said means including a valve capable of permitting selective flow of serum;

a movable plug positioned transversely across said compartment, and in said serum-collecting portion adjacent to said blocking means and in contact with the walls of said compartment for interrupting fluid flow of serum through the compartment, said plug being provided with means permitting flow of blood serum to said serum collecting portion when a centrifugal force sufficient to initiate separation of the blood serum from the blood cells is generated against the plug towards said closure means; and a chamber adjacent said serum-collecting portion, the interior walls of said chamber being generally cylindrically shaped, defining a chamber axis, a passageway being provided in said chamber walls which fluidly connects the chamber to the interior of said compartment, said valve including at least one valve stem within said chamber closing off said passageway, said stem being mounted for rotation about said chamber axis.

9. The device as defined in claim 8, and further including means on said stem for sealing off said one end when a partial vacuum is developed in said container.

10. The device as defined in claim 8 wherein said stem includes on the circumference thereof a flexible closure member projecting outwardly away therefrom, said member having sufficient size to close said one end and sufficient flexibility as to permit compression of the member, whereby the member can be forced out of said one end by rotation of the valve.

11. The device as defined in claim 8 wherein a portion of said stem is itself resilient, said stem being biased so as to fit within said chamber only under compression.

12. The device as defined in claim 8, and further including a face plate mounted within said chamber, said valve stem extending from said plate, said plate including at least one cavity shaped to mate with a driving member, said cavity being offset from said chamber axis.

13. The device as defined in claim 8, and further including a supporting leg depending from said valve at a position generally opposite to said stem.

14. The device as defined in claim 13, wherein the spacing between said stem and said leg, measured transversely to fluid flow therethrough when said valve is no longer blocking the passageway, is at least the same as the maximum dimension of said passageway so as to enhance serum flow into said chamber.

15. The device as defined in claim 8, wherein said valve includes an aperture generally aligned with said chamber axis, said aperture providing selectively sealed air communication from said chamber to the exterior of the device to permit pressurization of said chamber.

16. The device as defined in claim 8, wherein said chamber axis extends generally perpendicularly to said compartment axis.

17. The device as defined in claim 8, wherein said chamber axis is generally parallel to said compartment axis.

18. The device as defined in claim 8, wherein said plug is positioned within said chamber adjacent to said valve.

19. The device as defined in claim 8, wherein said chamber further includes a bottom wall having an inner and an outer surface, and opposed side walls extending from said inner surface to define at least one compartment having a capacity for the fluid sufficient to permit at least one drop to be dispensed therefrom, said bottom wall having an aperture, a platform connected to and spaced away from the said outer surface by a connecting surface, the distance between the platform and said outer surface being sufficient to prevent dispensed fluid from spreading from the platform to said outer surface, the connecting surface being inclined at an angle with respect to said platform which will confine the drop to the platform, the transition zone between the exterior surface of the platform and the connecting surface being sufficiently sharp as to form an edge which will confine the drop to said exterior surface, said platform having a generally circular aperture in fluid communication with said bottom wall aperture, said aperture having a diameter smaller than that which will permit gravity flow from the container of a biological fluid, said platform exterior surface defining a drop-contacting area which will support a drop having a volume between about 1 and about 30 $\mu$ 1.

20. The device as claimed in claim 19, wherein said platform has a cross-sectional thickness taken along a plane extending perpendicular to said platform, which thickness is less than that of said bottom wall and no greater than about 0.026 cm.

21. A blood serum separation device, comprising opposed walls arranged about an axis to define a blood separation compartment said compartment having opposed ends, a serum-collecting portion adjacent one compartment end, and a cell-collecting portion adjacent the other end;

closure means for closing said other end;

means for temporarily blocking flow of serum out of said one compartment end;

said blocking means including a frangible member completely covering said one end;

a movable plug positioned transversely across said compartment, and in said serum-collecting portion adjacent to said blocking means and in contact with the walls of said compartment around the entire perimeter of said walls, for interrupting fluid flow of serum through the compartment, said plug comprising an inorganic thixotropic polymeric gel which is inert to the serum, whereby flow of blood serum to said serum collecting portion occurs when a centrifugal force sufficient to initiate separation of the blood serum from the blood cells is generated against the plug towards said closure means;

and a dispensing chamber disposed adjacent to said serum-collecting portion, the walls of the chamber having a passageway communication with said second compartment, said body further including a platform in which said opening is generally centered, for the formation of drops, said opening having a maximum dimension which is sufficiently small to prevent flow of the biological fluid therethrough under gravity; and means on said one body face for identifying the source of the fluid; whereby the container can be transported from the patient to a metering station without transferring the fluid or any part thereof to another container.

22. The device as defined in claim 21, and further including a passageway through said plunger for the flow of blood serum.

23. The device as defined in claim 21, wherein said plunger is further provided with a frangible portion extending generally parallel to said frangible member, whereby a pour-out tube can be pushed through both said portion and said frangible member to permit the serum to bypass said chamber.

24. A blood processing container, the container comprising an exterior, unitized body, having two opposite ends and at least one exterior face extending between the two ends, said body having a first compartment for serum separation, said compartment extending from one of said ends to a first locator surface spaced from the other end, said body having a second compartment oriented so as to extend generally perpendicularly to said first compartment between said ends to a second locator surface, said compartments being in selective fluid communication;

a septum secured to said one end, comprising a self-sealing elastomeric material capable of penetration by a cannula;

a valve interposed with respect to said compartments so as to selectively block fluid flow between said compartments;

said body including a third compartment extending from said second locator surface to an opening in said body between said ends, said third compartment being in fluid communication with said second compartment, said body further including a platform in which said opening is generally centered, for the formation of drops, said opening having a maximum dimension which is sufficiently small to prevent flow of serum therethrough under gravity;

means on said one body face for identifying the source of blood;

and sealing means within said first compartment for preventing intermixing of serum and blood cells after separation; whereby the container can be transported from the blood-donating patient, to a serum-separating station, and to a metering station without transferring the blood or any part thereof to another container.

25. The container as defined in claim 24, wherein said sealing means include a movable plug disposed adjacent to said valve in contact with said body transversely across said compartment so as to block flow of serum through the compartment, said plug comprising an inorganic, thixotropic polymeric gel having a specific gravity between about 1.03 and about 1.05, and a viscosity between about 400 and about 500 poises at a shear rate of about 500 $sec.^{-1}$.

26. The container as defined in claim 24, wherein said valve includes a frangible member and a plunger slidably mounted with respect to said second compartment, aligned generally perpendicular to said frangible member.

27. The container as defined in claim 24, wherein at least said one body face has a notch extending into the body towards said first compartment, whereby said body can be broken and said first and second compartments can be separated.

28. The container as defined in claim 24, wherein said one body face is provided with either a groove or a rib extending the length of said body, of a shape and size capable of fitting with said rib or said groove of an identical, second container, for stacking.

29. A biological fluid processing container, the container comprising an exterior, unitized body, having two opposite ends and at least one exterior face extending between the two ends, said body having a first compartment for a biological fluid, said compartment extending from one of said ends to a first locator surface spaced from the other end, said body having a second compartment oriented so as to extend generally perpendicularly to said first compartment between said ends to a second locator surface, said compartments being in selective fluid communication;

a septum secured to said one end, comprising a self-sealing elastomeric material capable of penetration by a cannula;

a valve interposed with respect to said compartments so as to selectively block fluid flow between said compartments;

means interposed between said septum and said valve, for maintaining phase separation between phases separated within said first compartment;

said body including a third compartment extending from said second locator surface to an opening in said body between said ends, said third compartment being in fluid at one side thereof suitable for the formation of drops, said platform being provided with an aperture permitting forced fluid flow of serum from the interior of the chamber, the maximum dimension of the aperture being sufficiently small as to prevent flow of the serum under gravity.

* * * * *

CERTIFICATE OF CORRECTION

PATENT NO. : 4,012,325

DATED : March 15, 1977

INVENTOR(S) : Richard L. Columbus

It is certified that error appears in the above-identified patent and that said Letters Patent are hereby corrected as shown below:

Lines 1 and 2 of the Abstract should read as follows: --A blood serum separator-dispensing is disclosed, capable of collecting, separating and/or dispensing a biologi- --.

Column 2, line 8, and Column 4, line 55, "silical" should read --silica--.

Column 6, line 2, after "ary" insert --blocking--.

Column 10, second last line of Table 1, first column, "X( $m^2$ )" should read --X( $1^2$ )--; and in last line of Table 1, second column "2.2" should read --2.3--.

Column 10, line 50, "isometric" should read --isosmotic--.

Column 19, lines 34-41, "fluidly connecting the chamber to said compartment, said passageway being selectively blocked by said frangible member, and a plunger slidably mounted within said chamber and aligned generally perpendicularly with respect to said frangible member, said plunger terminating in a point sufficiently sharp as to penetrate said frangible member when pushed thereagainst by hand." should read --at one side thereof suitable for the formation of drops, said platform being provided with an aperture permitting forced fluid flow of serum from the interior of the chamber, the maximum dimension of the aperture being sufficiently small as to prevent flow of the serum under gravity.--

UNITED STATES PATENT AND TRADEMARK OFFICE

CERTIFICATE OF CORRECTION

PATENT NO. : 4,012,325

DATED : March 15, 1977

INVENTOR(S) : Richard L. Columbus

It is certified that error appears in the above-identified patent and that said Letters Patent are hereby corrected as shown below:

Column 19, line 49, "adajcent" should read --adjacent--.

Column 21, lines 43-54, "communication with said second compartment, said body further including a platform in which said opening is generally centered, for the formation of drops, said opening having a maximum dimension which is sufficiently small to prevent flow of the biological fluid therethrough under gravity; and means on said one body face for identifying the source of the fluid; whereby the container can be transported from the patient to a metering station without transferring the fluid or any part thereof to another container." should read --fluidly connecting the chamber to said compartment, said passageway being selectively blocked by said frangible member, and a plunger slidably mounted within said chamber and aligned generally perpendicularly with respect to said frangible member, said plunger terminating in a point sufficiently sharp as to penetrate said frangible member when pushed thereagainst by hand.--

Column 24, lines 7-13, "at one side thereof suitable for the formation of drops, said platform being provided with an aperture permitting forced fluid flow of serum from the interior of the chamber, the maximum dimension of the aperture being sufficiently small as to prevent flow of the serum under gravity." should read --communication with said second compartment, said body further including a platform in which said opening is generally centered, for the formation of drops, said opening having a maximum dimension which is sufficiently small to prevent flow of the biological fluid therethrough under gravity; and

UNITED STATES PATENT AND TRADEMARK OFFICE

CERTIFICATE OF CORRECTION

PATENT NO. : 4,012,325

DATED : March 15, 1977

INVENTOR(S) : Richard L. Columbus

It is certified that error appears in the above-identified patent and that said Letters Patent are hereby corrected as shown below:

means on said one body face for identifying the source of the fluid;
whereby the container can be transported from the patient to a metering station without transferring the fluid or any part thereof to another container.--

Signed and Sealed this

Fourteenth Day of June 1977

[SEAL]

*Attest:*

RUTH C. MASON
*Attesting Officer*

C. MARSHALL DANN
*Commissioner of Patents and Trademarks*